United States Patent
Yokino et al.

(10) Patent No.: US 10,060,792 B2
(45) Date of Patent: Aug. 28, 2018

(54) SPECTROMETER, AND SPECTROMETER PRODUCTION METHOD

(71) Applicant: HAMAMATSU PHOTONICS K.K., Hamamatsu-shi, Shizuoka (JP)

(72) Inventors: Takafumi Yokino, Hamamatsu (JP); Katsumi Shibayama, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/116,893

(22) PCT Filed: Feb. 3, 2015

(86) PCT No.: PCT/JP2015/052926
§ 371 (c)(1),
(2) Date: Aug. 5, 2016

(87) PCT Pub. No.: WO2015/119094
PCT Pub. Date: Aug. 13, 2015

(65) Prior Publication Data
US 2017/0167917 A1    Jun. 15, 2017

(30) Foreign Application Priority Data
Feb. 5, 2014  (JP) .................................. 2014-020667

(51) Int. Cl.
*G01J 3/02*  (2006.01)
*G01J 3/18*  (2006.01)
(Continued)

(52) U.S. Cl.
CPC ............. *G01J 3/0256* (2013.01); *G01J 3/021* (2013.01); *G01J 3/0286* (2013.01);
(Continued)

(58) Field of Classification Search
CPC ........ G01J 3/0256; G01J 3/021; G01J 3/0289; G01J 3/04; G01J 3/0286; G01J 3/36;
(Continued)

(56) References Cited

U.S. PATENT DOCUMENTS 4,468,122 A *  8/1984  Puryaev ............... G01B 11/255
                                                     356/513
5,050,991 A *  9/1991  Welch ....................... G01J 3/42
                                                      356/326

(Continued)

FOREIGN PATENT DOCUMENTS

CN    1550905    12/2004
CN    1637608    7/2005
(Continued)

OTHER PUBLICATIONS

International Preliminary Report on Patentability dated Aug. 18, 2016 for PCT/JP2015/052926.

*Primary Examiner* — Mohamed K Amara
(74) *Attorney, Agent, or Firm* — Drinker Biddle & Reath LLP

(57) ABSTRACT

A spectrometer includes a light detection element provided with a light passing part, a first light detection part, and a second light detection part, a support fixed to the light detection element such that a space is formed, a first reflection part provided in the support and configured to reflect light passing through the light passing part in the space, a second reflection part provided in the light detection element and configured to reflect the light reflected by the first reflection part in the space, and a dispersive part provided in the support and configured to disperse and reflect the light reflected by the second reflection part to the first light detection part in the space. A plurality of second light detection parts is disposed in a region surrounding the second reflection part.

10 Claims, 7 Drawing Sheets

(51) Int. Cl.
*G01J 3/36* (2006.01)
*G01J 3/04* (2006.01)

(52) U.S. Cl.
CPC ............ *G01J 3/0289* (2013.01); *G01J 3/0291* (2013.01); *G01J 3/04* (2013.01); *G01J 3/18* (2013.01); *G01J 3/36* (2013.01)

(58) Field of Classification Search
CPC .......... G01J 3/0291; G01J 3/18; G01J 3/0259; G01J 3/2823; G01J 3/0208
See application file for complete search history.

(56) References Cited

U.S. PATENT DOCUMENTS

| | | | | |
|---|---|---|---|---|
| 5,473,438 A * | 12/1995 | Keranen | ............... | G01J 3/02 356/419 |
| 5,815,278 A * | 9/1998 | Johnston | ............... | G01N 21/553 356/445 |
| 6,249,348 B1 * | 6/2001 | Jung | ............... | G01J 1/0411 250/226 |
| 6,303,934 B1 * | 10/2001 | Daly | ............... | G01J 3/02 250/339.02 |
| 6,587,198 B2 * | 7/2003 | Olshausen | ............... | G01J 3/02 356/328 |
| 6,657,723 B2 * | 12/2003 | Cohen | ............... | G02B 6/12007 356/328 |
| 6,862,092 B1 * | 3/2005 | Ibsen | ............... | G01J 3/00 356/328 |
| 6,886,953 B2 * | 5/2005 | Cook | ............... | G01J 3/02 359/858 |
| 6,980,295 B2 * | 12/2005 | Lerner | ............... | G01J 3/18 250/339.07 |
| 6,985,226 B2 * | 1/2006 | Lerner | ............... | G01J 3/02 356/328 |
| 7,041,979 B2 * | 5/2006 | Chrisp | ............... | G01J 3/02 250/339.07 |
| 7,075,082 B2 * | 7/2006 | Tsao | ............... | G01J 3/02 250/339.07 |
| 7,148,488 B2 * | 12/2006 | Horton | ............... | G01N 21/33 250/372 |
| 7,161,673 B2 * | 1/2007 | Da Silva | ............... | G01J 3/02 356/328 |
| 7,180,590 B2 * | 2/2007 | Bastue | ............... | G01J 3/02 356/326 |
| 7,239,386 B2 * | 7/2007 | Chrisp | ............... | G01J 3/18 356/328 |
| 7,817,274 B2 * | 10/2010 | Zhang | ............... | G01J 3/02 356/328 |
| 8,390,806 B1 * | 3/2013 | Subramanian | ........ | G01J 3/0259 356/301 |
| 8,861,060 B2 * | 10/2014 | Puegner | ............... | G01J 3/0202 359/197.1 |
| 9,435,689 B2 * | 9/2016 | Comstock, II | ........ | G01J 3/2823 |
| 9,625,317 B2 * | 4/2017 | Correns | ............... | G01J 3/18 |
| 2002/0060792 A1 * | 5/2002 | Ibsen | ............... | G01J 3/02 356/328 |
| 2004/0211920 A1 | 10/2004 | Derksen et al. | | |
| 2004/0239931 A1 * | 12/2004 | Teichmann | ........... | G01J 3/0256 356/328 |
| 2005/0175362 A1 * | 8/2005 | Wilson | ............... | G01J 3/02 398/212 |
| 2006/0139636 A1 * | 6/2006 | Kerstan | ............... | G01J 3/02 356/328 |
| 2006/0268269 A1 * | 11/2006 | Warren | ............... | G01J 3/02 356/328 |
| 2007/0019194 A1 * | 1/2007 | Chen | ............... | G01J 3/02 356/328 |
| 2007/0030483 A1 * | 2/2007 | Everett | ............... | G01J 3/02 356/328 |
| 2007/0152154 A1 * | 7/2007 | DeCamp | ............... | G01J 3/2803 250/339.07 |
| 2007/0194239 A1 * | 8/2007 | McAllister | ............... | G01J 3/02 250/339.07 |
| 2007/0252989 A1 * | 11/2007 | Comstock | ............... | G01J 3/02 356/328 |
| 2008/0013086 A1 * | 1/2008 | Deck | ............... | G01J 3/02 356/328 |
| 2009/0262346 A1 * | 10/2009 | Egloff | ............... | G01J 3/02 356/326 |
| 2010/0309454 A1 * | 12/2010 | Zhang | ............... | G01J 3/02 356/39 |
| 2010/0315634 A1 * | 12/2010 | Shibayama | ............... | G01J 3/02 356/326 |
| 2016/0042221 A1 * | 2/2016 | Mei | ............... | G06K 9/0061 382/103 |
| 2017/0010156 A1 * | 1/2017 | Yokino | ............... | G01J 3/0291 |
| 2017/0167917 A1 * | 6/2017 | Yokino | ............... | G01J 3/0291 |
| 2017/0184454 A1 * | 6/2017 | Nakai | ............... | G01J 3/502 |
| 2017/0363469 A1 * | 12/2017 | Sabry | ............... | G01J 3/0208 |
| 2018/0017806 A1 * | 1/2018 | Wang | ............... | G01B 9/02044 |

FOREIGN PATENT DOCUMENTS

| | | |
|---|---|---|
| JP | 2000-298066 A | 10/2000 |
| JP | 2003-234281 | 8/2003 |
| JP | 2004-024184 | 1/2004 |
| JP | 2004-241084 A | 8/2004 |

\* cited by examiner (a)

(b)

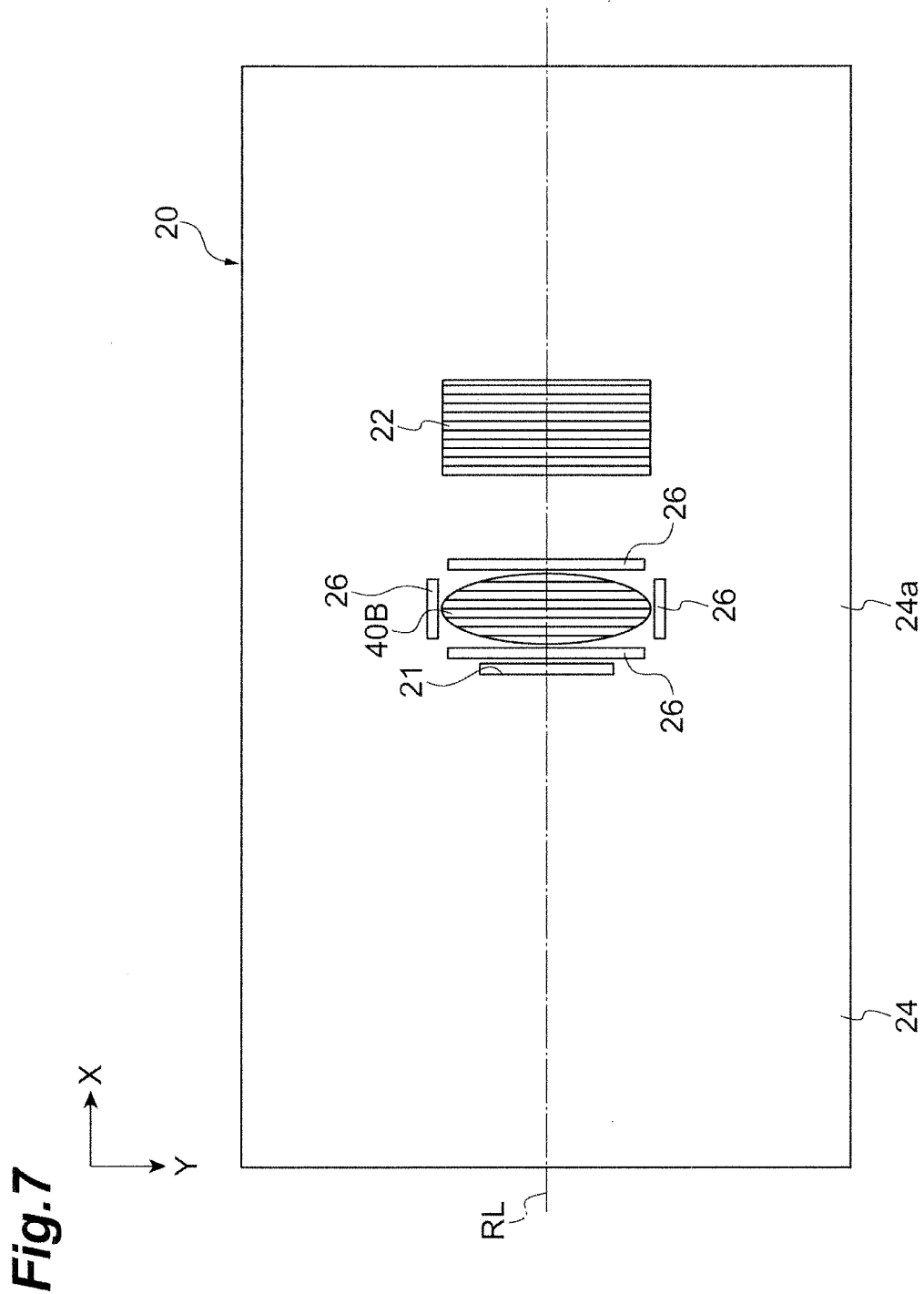

SPECTROMETER, AND SPECTROMETER PRODUCTION METHOD

TECHNICAL FIELD

The present invention relates to a spectrometer which disperses and detects light, and a method for manufacturing the spectrometer.

BACKGROUND ART

For example, Patent Literature 1 discloses a spectrometer including a light entrance part, a dispersive part for dispersing and reflecting light incident thereon from the light entrance part, a light detection element for detecting the light dispersed and reflected by the dispersive part, and a box-shaped support for supporting the light entrance part, dispersive part, and light detection element.

CITATION LIST

Patent Literature

Patent Literature 1: Japanese Unexamined Patent Publication No. 2000-298066

SUMMARY OF INVENTION

Technical Problem

The above-described spectrometer requires further miniaturization in response to expansion of use. However, as the spectrometer is further miniaturized, detection accuracy of the spectrometer more easily decreases due to various causes.

It is therefore an object of the present invention to provide a spectrometer which can attempt miniaturization while suppressing a decrease in detection accuracy; and a method for manufacturing a spectrometer capable of easily manufacturing such a spectrometer.

Solution to Problem

A spectrometer in accordance with one aspect of the present invention includes a light detection element provided with a light passing part, a first light detection part, and a second light detection part, a support fixed to the light detection element such that a space is formed among the light passing part, the first light detection part, and the second light detection part, a first optical part provided in the support and configured to reflect light passing through the light passing part in the space, a second optical part provided in the light detection element and configured to reflect the light reflected by the first optical part in the space, and a third optical part provided in the support and configured to reflect the light reflected by the second optical part to the first light detection part in the space, the second optical part or the third optical part disperses and reflects entered light in the space, and a plurality of second light detection parts is disposed in a region surrounding the second optical part.

In the spectrometer, an optical path from the light passing part to the first light detection part is formed in the space which is formed by the light detection element and the support. In this way, miniaturization of the spectrometer may be attempted. Further, the plurality of second light detection parts is disposed in the region that surrounds the second optical part. In this way, in the region that surrounds the second reflection part, a state of light before being dispersed may be monitored, and the entrance NA, an incident direction, etc. of the light passing through the light passing part may be appropriately adjusted. Therefore, the spectrometer may attempt miniaturization while suppressing a decrease in detection accuracy.

In the spectrometer in accordance with one aspect of the present invention, the first optical part may be a first reflection part and configured to reflect the light passing through the light passing part in the space, the second optical part may be a second reflection part and configured to reflect the light reflected by the first reflection part in the space, and the third optical part may be a dispersive part and configured to disperse and reflect the light reflected by the second reflection part to the first light detection part in the space. According to this configuration, the light passing through the light passing part is reflected by the first reflection part and the second reflection part in sequence, and enters the dispersive part. In this way, an incident direction of the light entering the dispersive part and a divergence or convergence state of the light may be easily adjusted. Thus, even when the length of an optical path from the dispersive part to the first light detection part is short, the light dispersed by the dispersive part may be accurately concentrated on a predetermined position of the first light detection part.

In the spectrometer in accordance with one aspect of the present invention, the first optical part may be a first reflection part and configured to reflect the light passing through the light passing part in the space, the second optical part may be a dispersive part and configured to disperse and reflect the light reflected by the first reflection part in the space, and the third optical part may be a second reflection part and configured to reflect the light dispersed and reflected by the dispersive part to the first light detection part in the space. According to this configuration, the dispersive part in addition to the light passing part, the first light detection part, and the second light detection parts is provided in the light detection element. Thus, it is possible to accurately maintain a mutual positional relationship among the light passing part, the dispersive part, the first light detection part, and the second light detection parts. Furthermore, when the dispersive part, the production of which is easily complicated when compared to the first reflection part and the second reflection part, is provided in the light detection element together with the light passing part, the first light detection part, and the second light detection parts, it is possible to improve a yield of the support, and thus improve a yield of the spectrometer.

In the spectrometer in accordance with one aspect of the present invention, the light passing part, the first optical part, the second optical part, the third optical part, and the first light detection part may be arranged along a reference line when viewed in an optical axis direction of the light passing through the light passing part, and the plurality of second light detection parts may oppose each other with the second optical part interposed therebetween in each of a direction parallel to the reference line and a direction perpendicular to the reference line when viewed in an optical axis direction. According to this configuration, it is possible to monitor a shift direction of light entering the second optical part in each of the direction parallel to the reference line and the direction perpendicular to the reference line.

In the spectrometer in accordance with one aspect of the present invention, the plurality of second light detection parts may be arranged along an outer edge of the second optical part to surround the second optical part. According to this configuration, it is possible to monitor a shift direction of light entering the second optical part all around the second optical part.

In the spectrometer in accordance with one aspect of the present invention, the plurality of second light detection parts may be arranged in a two-dimensional shape in the region surrounding the second optical part. According to this configuration, it is possible to monitor a shift direction of light entering the second optical part as an image all around the second optical part.

In the spectrometer in accordance with one aspect of the present invention, the support may be provided with a wiring electrically connected to the first light detection part and the second light detection parts, and an end part of the wiring on a side of the first light detection part and the second light detection parts may be connected to a terminal provided in the light detection element in a fixed part of the light detection element and the support.

In the spectrometer in accordance with one aspect of the present invention, a material of the support may be ceramic. According to this configuration, it is possible to suppress expansion and contraction of the support resulting from a temperature change of an environment in which the spectrometer is used, etc. Therefore, it is possible to suppress a decrease in detection accuracy (a shift of peak wavelength in light detected by the first light detection part, etc.) resulting from occurrence of a variance in a positional relationship between the dispersive part and the first light detection part.

In the spectrometer in accordance with one aspect of the present invention, the space may be airtightly sealed by a package including the light detection element and the support as components. According to this configuration, it is possible to suppress a decrease in detection accuracy resulting from deterioration of a member in the space due to moisture, occurrence of condensation in the space due to a decrease in ambient temperature, etc.

In the spectrometer in accordance with one aspect of the present invention, the space may be airtightly sealed by a package accommodating the light detection element and the support. According to this configuration, it is possible to suppress a decrease in detection accuracy resulting from deterioration of a member in the space due to moisture, occurrence of condensation in the space due to a decrease in ambient temperature, etc.

A spectrometer in accordance with one aspect of the present invention includes a light detection element provided with a light passing part and a light detection part, a support fixed to the light detection element such that a space is formed between the light passing part and the light detection part, a first reflection part provided in the support and configured to reflect light passing through the light passing part in the space, a dispersive part provided in the light detection element and configured to disperse and reflect the light reflected by the first reflection part in the space, and a second reflection part and configured to provided in the support to reflect the light dispersed and reflected by the dispersive part to the light detection part in the space.

In the spectrometer, an optical path from the light passing part to the light detection part is formed in the space formed by the light detection element and the support. In this way, miniaturization of the spectrometer may be attempted. Further, the dispersive part in addition to the light passing part and the light detection part is provided in the light detection element. In this way, a mutual positional relationship of the light passing part, the dispersive part, and the light detection part is accurately maintained. Therefore, according to this spectrometer, it is possible to attempt miniaturization while suppressing a decrease in detection accuracy.

A method for manufacturing a spectrometer in accordance with one aspect of the present invention includes a first step of preparing a support provided with a first reflection part and a second reflection part, a second step of preparing a light detection element provided with a light passing part, a dispersive part, and a light detection part, and a third step of fixing the support and the light detection element such that a space is formed after the first step and the second step, thereby forming, in the space, an optical path on which light passing through the light passing part is reflected by the first reflection part, the light reflected by the first reflection part is dispersed and reflected by the dispersive part, the light dispersed and reflected by the dispersive part is reflected by the second reflection part, and the light reflected by the second reflection part enters the light detection part.

In the method for manufacturing the spectrometer, an optical path from the light passing part to the light detection part is formed in the space only by fixing the support provided with the first reflection part and the second reflection part to the light detection element provided with the light passing part, the dispersive part, and the light detection part. Therefore, according to the method for manufacturing the spectrometer, it is possible to easily produce the spectrometer which can attempt miniaturization while suppressing a decrease in detection accuracy. The first step and the second step may be implemented in an arbitrary order.

Advantageous Effects of Invention

The present invention can provide a spectrometer which can attempt miniaturization while suppressing a decrease in detection accuracy, and a method for manufacturing a spectrometer capable of easily manufacturing such a spectrometer.

BRIEF DESCRIPTION OF DRAWINGS

FIG. 7 is a plan view of a light detection element of the spectrometer in accordance with the second embodiment of the invention.

DESCRIPTION OF EMBODIMENTS

Figure 1:
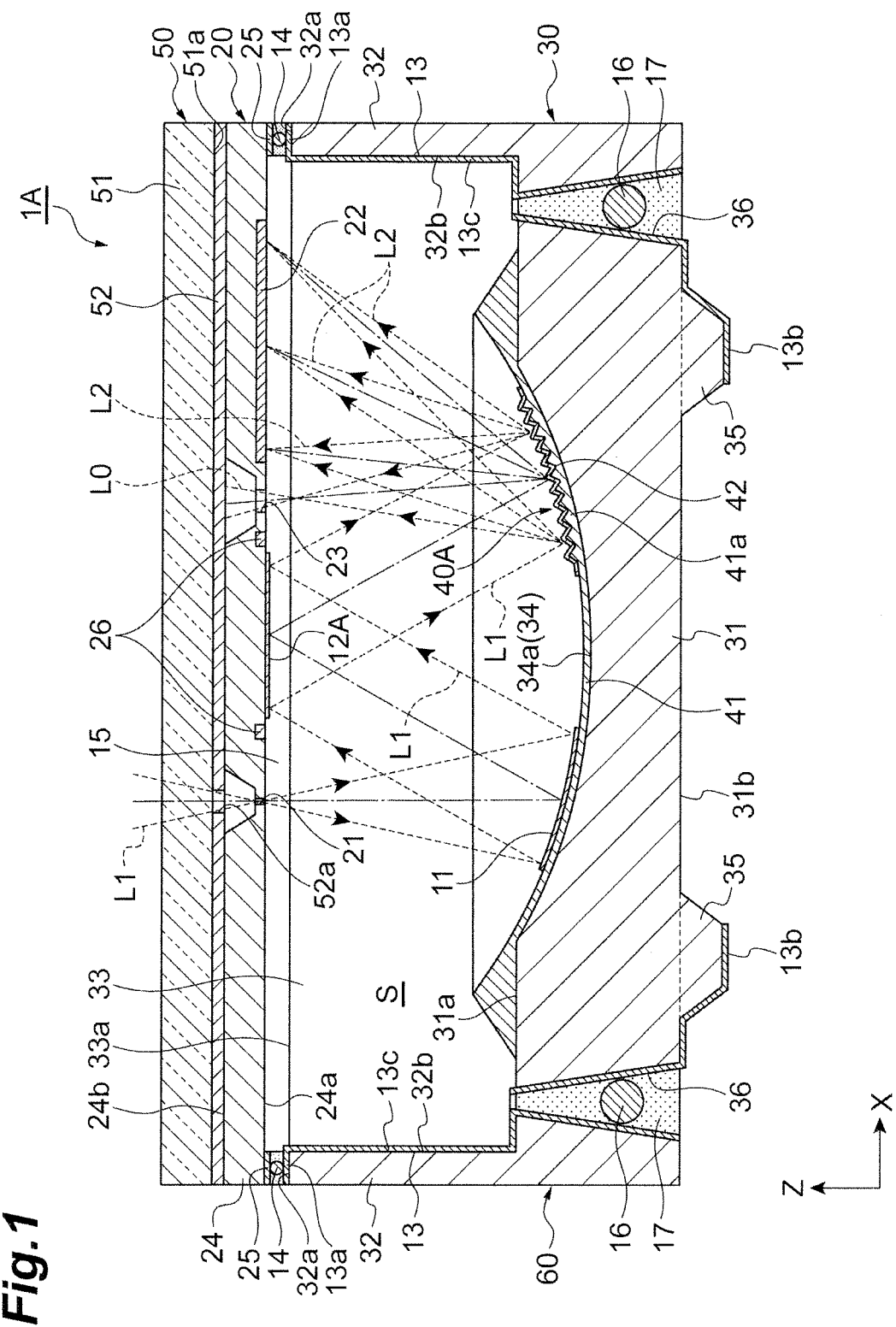
FIG. 1 is a cross-sectional view of a spectrometer in accordance with a first embodiment of the invention.

In the following, preferred embodiments of the present invention will be explained in detail with reference to the drawings. In the drawings, the same or equivalent parts will be referred to with the same signs while omitting their overlapping descriptions.

First Embodiment

Figure 2:
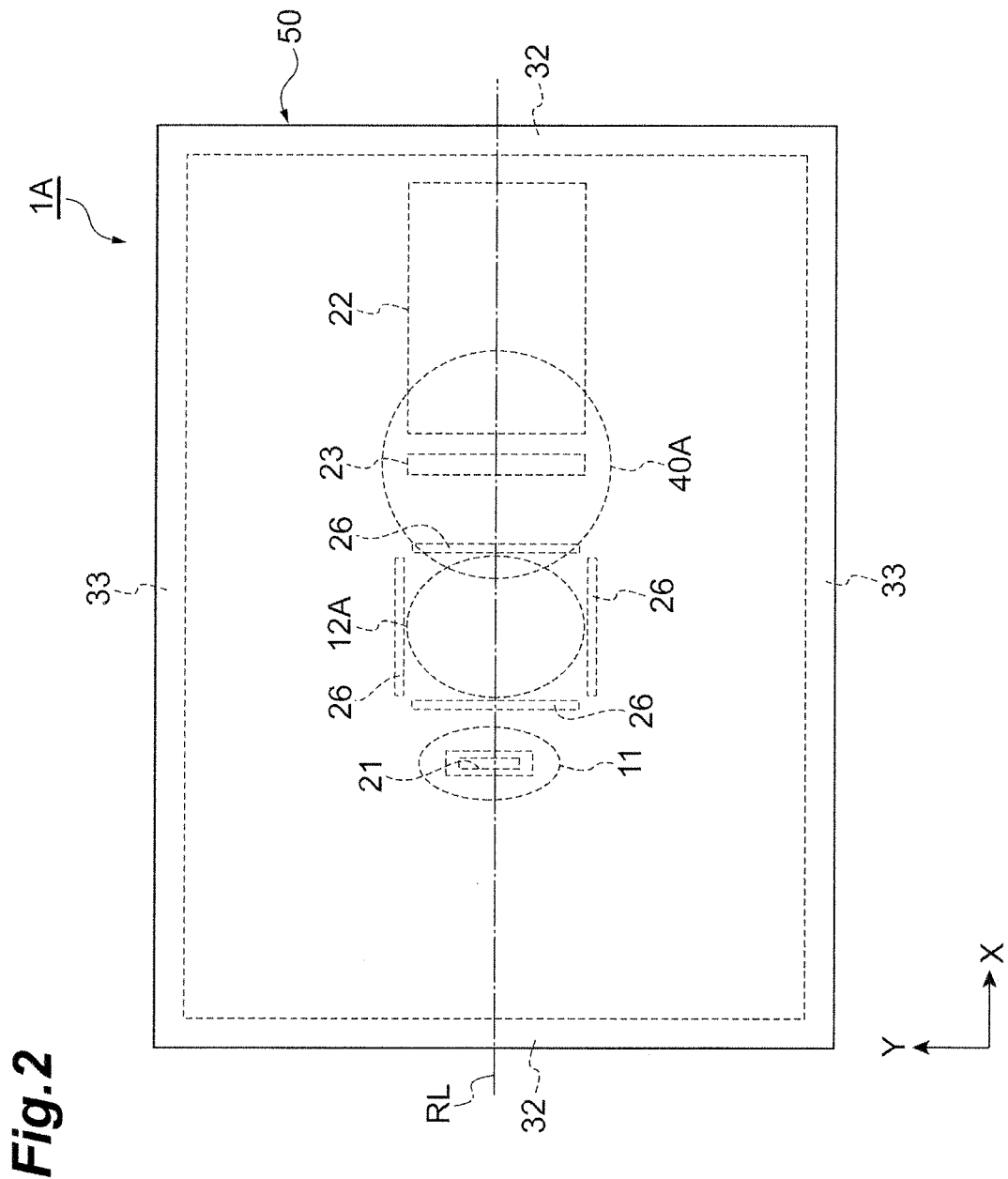
FIG. 2 is a plan view of the spectrometer in accordance with the first embodiment of the invention.

As illustrated in FIGS. 1 and 2, a spectrometer 1A includes a light detection element 20, a support 30, a first reflection part (first optical part) 11, a second reflection part (second optical part) 12A, a dispersive part (third optical part) 40A, and a cover 50. The light detection element 20 is provided with a light passing part 21, a first light detection part 22, a plurality of second light detection parts 26, and a zero-order light capture part 23. The support 30 is provided with a wiring 13 for inputting/outputting electric signals to/from the first light detection part 22 and the second light detection parts 26. The support 30 is fixed to the light detection element 20 such that a space S is formed among the light passing part 21, the first light detection part 22, the plurality of second light detection parts 26, and the zero-order light capture part 23. For example, the spectrometer 1A is formed in a shape of a rectangular parallelepiped, a length of which in each of an X-axis direction, a Y-axis direction, and a Z-axis direction is less than or equal to 10 mm. The wiring 13 and the support 30 are configured as a molded interconnect device (MID).

The light passing part 21, the first reflection part 11, the second reflection part 12A, the dispersive part 40A, the first light detection part 22, and the zero-order light capture part 23 are arranged side by side along a reference line RL that extends in the X-axis direction when viewed in an optical axis direction of light L1 passing through the light passing part 21 (that is, the Z-axis direction). In the spectrometer 1A, the light L1 passing through the light passing part 21 is reflected by the first reflection part 11 and the second reflection part 12A in sequence, enters the dispersive part 40A, and is dispersed and reflected by the dispersive part 40A. Then, light L2 other than zero-order light L0 in light dispersed and reflected by the dispersive part 40A enters the first light detection part 22 and is detected by the first light detection part 22. The zero-order light L0 in the light dispersed and reflected by the dispersive part 40 enters the zero-order light capture part 23 and is captured by the zero-order light capture part 23. An optical path of the light L1 from the light passing part 21 to the dispersive part 40A, an optical path of the light L2 from the dispersive part 40A to the first light detection part 22, and an optical path of the zero-order light L0 from the dispersive part 40A to the zero-order light capture part 23 are formed in the space S.

The light detection element 20 includes a substrate 24. For example, the substrate 24 is formed in a rectangular plate shape using a semiconductor material such as silicone. The light passing part 21 is a slit formed in the substrate 24, and extends in the Y-axis direction. The zero-order light capture part 23 is a slit formed in the substrate 24, and extends in the Y-axis direction between the light passing part 21 and the first light detection part 22. In the light passing part 21, an end part on an entrance side of the light L1 widens toward the entrance side of the light L1 in each of the X- and Y-axis directions. In addition, in the zero-order light capture part 23, an end part on the opposite side from an entrance side of the zero-order light L0 widens toward the opposite side from the entrance side of the zero-order light L0 in each of the X- and Y-axis directions. When the zero-order light L0 is configured to obliquely enter the zero-order light capture part 23, the zero-order light L0 entering the zero-order light capture part 23 may be more reliably inhibited from returning to the space S.

The first light detection part 22 is provided on a surface 24a of the substrate 24 on the space S side. More specifically, the first light detection part 22 is put in the substrate 24 made of the semiconductor material rather than being attached to the substrate 24. That is, the first light detection part 22 includes a plurality of photodiodes formed in a first conductivity type region inside the substrate 24 made of a semiconductor material and a second conductivity type region provided within the region. For example, the first light detection part 22 is configured as a photodiode array, a C-MOS image sensor, a CCD image sensor, etc., and has a plurality of light detection channels arranged along the reference line RL. Lights L2 having different wavelengths are let into the respective light detection channels of the first light detection part 22. Similarly to the first light detection part 22, each of the second light detection parts 26 is a photodiode put in the substrate 24, and is disposed in a region that surrounds the second reflection part 12A. A plurality of terminals 25 for inputting/outputting electric signals to/from the first light detection part 22 and the second light detection parts 26 is provided on the surface 24a of the substrate 24. The first light detection part 22 and the second light detection parts 26 may be configured as surface-incident photodiodes or back surface-incident photodiodes. For example, when the first light detection part 22 and the second light detection parts 26 are configured as the surface-incident photodiodes, the first light detection part 22 and the second light detection parts 26 are positioned at the same height as that of a light exit of the light passing part 21 (that is, the surface 24a of the substrate 24 on the space S side). In addition, for example, when the first light detection part 22 and the second light detection parts 26 are configured as the back surface-incident photodiodes, the first light detection part 22 and the second light detection parts 26 are positioned at the same height as that of a light entrance of the light passing part 21 (that is, a surface 24b of the substrate 24 on the opposite side from the space S side).

Figure 3:
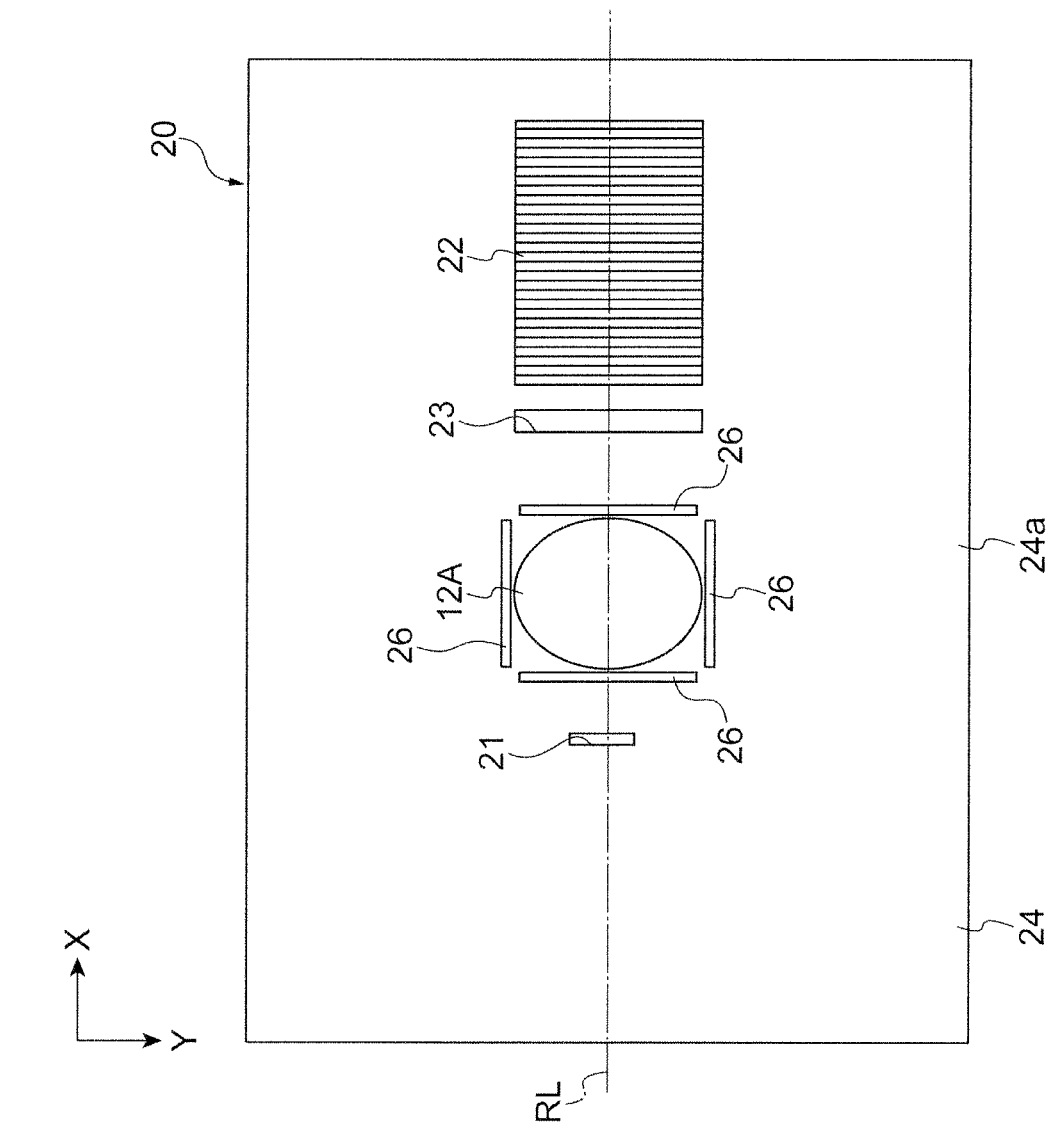
FIG. 3 is a plan view of a light detection element of the spectrometer in accordance with the first embodiment of the invention.

As illustrated in FIG. 3, the plurality of second light detection parts 26 opposes each other with the second reflection part 12A interposed therebetween in each of a direction parallel to the reference line RL and a direction perpendicular to the reference line RL when viewed in the optical axis direction of the light L1 passing through the light passing part 21. Each of the second light detection parts 26 opposing each other in the direction parallel to the reference line RL has a long shape extending in the Y-axis direction. Each of the second light detection parts 26 opposing each other in the direction perpendicular to the reference line RL has a long shape extending in the X-axis direction.

As illustrated in FIG. 1 and FIG. 2, the support 30 has a base wall part 31, a pair of side wall parts 32, and a pair of side wall parts 33. The base wall part 31 opposes the light detection element 20 in the Z-axis direction through the space S. A depression 34 open to the space S side, a plurality of projections 35 protruding to the opposite side from the space S side, and a plurality of through holes 36 open to the space S side and the opposite side from the space S side are formed in the base wall part 31. The pair of side wall parts 32 opposes each other in the X-axis direction through the space S. The pair of side wall parts 33 opposes each other in the Y-axis direction through the space S. The base wait part 31, the pair of side wall parts 32, and the pair of side wall parts 33 are integrally formed using ceramic such as AlN or $Al_2O_3$.

The first reflection part 11 is provided in the support 30. More specifically, the first reflection part 11 is provided in a spherical region of an inner surface 34a of the depression 34 in a surface 31a of the base wall part 31 on the space S side with a molded layer 41 interposed therebetween. For example, the first reflection part 11 is a concave mirror including a metal evaporated film of Al, Au, etc. and having a mirror surface. The first reflection part 11 reflects the light L1 passing through the light passing part 21 to the second reflection part 12A in the space S. The first reflection part 11 may be directly provided in the spherical region of the inner surface 34a of the depression 34 without the molded layer 41 interposed therebetween.

The second reflection part 12A is provided in the light detection element 20. More specifically, the second reflection part 12A is provided in a region between the light passing part 21 and the zero-order light capture part 23 on the surface 24a of the substrate 24. For example, the second reflection part 12A is a planar mirror including a metal evaporated film of Al, Au, etc. and having a mirror surface. The second reflection part 12A reflects the light which is reflected by the first reflection part 11, to the dispersive part 40A in the space S.

The dispersive part 40A is provided in the support 30. Details thereof are described below. That is, the molded layer 41 is disposed to cover the depression 34 on the surface 31a of the base wall part 31. The molded layer 41 is formed into a film along an inner surface 34a of the depression 34. For example, a grating pattern 41a corresponding to a blazed grating having a serrated cross section, a binary grating having a rectangular cross section, a holographic grating having a sinusoidal cross section, etc. is formed in a predetermined region of the molded layer 41 corresponding to a spherical region on the inner surface 34a. For example, a reflecting film 42 including a metal evaporated film of Al, Au, etc. is formed on the molded layer 41 to cover the grating pattern 41a. The reflecting film 42 is formed along a shape of the grating pattern 41a. A surface of the reflecting film 42, which is formed along the shape of the grating pattern 41a, on the space S side serves as the dispersive part 40A in the form of a reflection grating. The molded layer 41 is formed by pressing a mold die against a molding material (e.g., photocuring epoxy resins, acrylic resins, fluorine-based resins, silicone, and replica optical resins such as organic/inorganic hybrid resins) and curing the molding material (by photocuring or thermal curing using UV light, etc.) in this state.

As described in the foregoing, the dispersive part 40A is provided in the spherical region of the inner surface 34a of the depression 34 in the surface 31a of the base wall part 31. The dispersive part 40A has a plurality of grating grooves arranged along the reference line RL, and disperses and reflects the light L1, which is reflected by the second reflection part 12A, to the first light detection part 22 in the space S. The dispersive part 40A is not restricted to a dispersive part directly formed in the support 30 as described above. For example, the dispersive part 40A may be provided in the support 30 by attaching a dispersive element, which has the dispersive part 40A and a substrate on which the dispersive part 40A is formed, to the support 30.

Each wiring 13 has an end part 13a on a side of the first light detection part 22 and second light detection parts 26, an end part 13b on the opposite side from the side of the first light detection part 22 and second light detection parts 26, and a connection part 13c. The end part 13a of each wiring 13 is positioned on an end surface 32a of each side wall part 32 to oppose each terminal 25 of the light detection element 20. The end part 13b of each wiring 13 is positioned on a surface of each projection 35 in a surface 31b on the opposite side from the space S side in the base wall part 31. The connection part 13c of each wiring 13 reaches the end part 13b from the end part 13a on a surface 32b of each side wall part 32 on the space S side, the surface 31a of the base wall part 31, and an inner surface of each through hole 36. In this way, when the wiring 13 encloses a surface of the support 30 on the space S side, deterioration of the wiring 13 may be prevented.

For example, the terminal 25 of the light detection element 20 and the end part 13a of the wiring 13 opposing each other are connected to each other by a bump 14 made of Au, solder, etc. In the spectrometer 1A, the support 30 is fixed to the light detection element 20, and a plurality of wirings 13 is electrically connected to the first light detection part 22 and the second light detection parts 26 of the light detection element 20 by a plurality of bumps 14. In this way, the end part 13a of each wiring 13 is connected to each terminal 25 of the light detection element 20 in a fixed part of the light detection element 20 and the support 30.

The cover 50 is fixed to the surface 24b of the substrate 24 of the light detection element 20 on the opposite side from the space S side. The cover 50 has a light transmitting member 51 and a light shielding film 52. For example, the light transmitting member 51 is formed in a rectangular plate shape using a material which transmits the light L1 therethrough, examples of which include silica, borosilicate glass (BK7), Pyrex (registered trademark) glass, and Kovar glass. The light shielding film 52 is formed on a surface 51a of the light transmitting member 51 on the space S side. A light transmitting opening 52a is formed in the light shielding film 52 to oppose the light passing part 21 of the light detection element 20 in the Z-axis direction. The light transmitting opening 52a is a slit formed in the light shielding film 52, and extends in the Y-axis direction. In the spectrometer 1A, an entrance NA of the light L1 that enters the space S is defined by the light transmitting opening 52a of the light shielding film 52 and the light passing part 21 of the light detection element 20.

When an infrared ray is detected, silicon, germanium, etc. is effective as a material of the light transmitting member 51. In addition, the light transmitting member 51 may be provided with an AR (Anti Reflection) coat, and may have such a filter function as to transmit therethrough only a predetermined wavelength of light. Further, for example, a black resist, Al, etc. may be used as a material of the light shielding film 52. Here, the black resist is effective as the material of the light shielding film 52 from a viewpoint that the zero-order light L0 entering the zero-order light capture part 23 is inhibited from returning to the space S.

In addition, the cover 50 may further include a light shielding film formed on a surface of the light transmitting member 51 on the opposite side from the space S side. In this case, when a light transmitting opening is formed in the light shielding film to oppose the light passing part 21 of the light detection element 20 in the Z-axis direction, the entrance NA of the light L1 entering the space S may be accurately defined using the light transmitting opening of the light shielding film, the light transmitting opening 52a of the light shielding film 52, and the light passing part 21 of the light detection element 20. Similarly to the light shielding film 52, for example, a black resist, Al, etc. may be used as a material of the light shielding film. In addition, when the cover 50 further includes the above-described light shielding film, a light transmitting opening may be formed in the light shielding film 52 to oppose the zero-order light capture part 23 of the light detection element 20 in the Z-axis direction. In this case, it is possible to more reliably inhibit the zero-order light L0 entering the zero-order light capture part 23 from returning to the space S.

For example, a sealing member 15 made of resin, etc. is disposed among the surface 24a of the substrate 24, the end surface 32a of each side wall part 32, and the end surface 33a of each side wall part 33. In addition, for example, a sealing member 16 made of glass beads, etc. is disposed inside the through hole 36 of the base wall part 31, and the inside of the through hole 36 is filled with a sealing member 17 made of resin. In the spectrometer 1A, the space S is airtightly sealed by a package 60 that includes the light detection element 20, the support 30, the cover 50, and the sealing members 15, 16, and 17 as components. When the spectrometer 1A is mounted on an external circuit board, the end part 13b of each wiring 13 functions as an electrode pad. The light passing part 21 and the zero-order light capture part 23 of the substrate 24 may be airtightly sealed by filling the light passing part 21 and the zero-order light capture part 23 of the substrate 24 with light transmitting resin in place of disposing the cover 50 on the surface 24b of the substrate 24. In addition, for example, the inside of the through hole 36 of the base wall part 31 may be filled with only the sealing member 17 made of the resin without disposing the sealing member 16 made of the glass beads, etc.

As described in the foregoing, in the spectrometer 1A, an optical path from the light passing part 21 to the first light detection part 22 is formed inside the space S which is formed by the light detection element 20 and the support 30. In this way, miniaturization of the spectrometer 1A may be attempted. Further, the plurality of second light detection parts 26 is disposed in the region that surrounds the second reflection part 12A. In this way, in the region that surrounds the second reflection part 12A, a state of light L1 before being dispersed may be monitored, and the entrance NA, the incident direction, etc. of the light L1 passing through the light passing part 21 may be appropriately adjusted. Therefore, the spectrometer 1A may attempt miniaturization while suppressing a decrease in detection accuracy.

In addition, in the spectrometer 1A, the plurality of second light detection parts 26 opposes each other with the second reflection part 12A interposed therebetween in each of the direction parallel to the reference line RL and the direction perpendicular to the reference line RL when viewed in the optical axis direction of the light L1 passing through the light passing part 21. In this way, it is possible to monitor a shift direction of the light L1 entering the second reflection part 12A in each of the direction parallel to the reference line RL and the direction perpendicular to the reference line RL.

Figure 4:
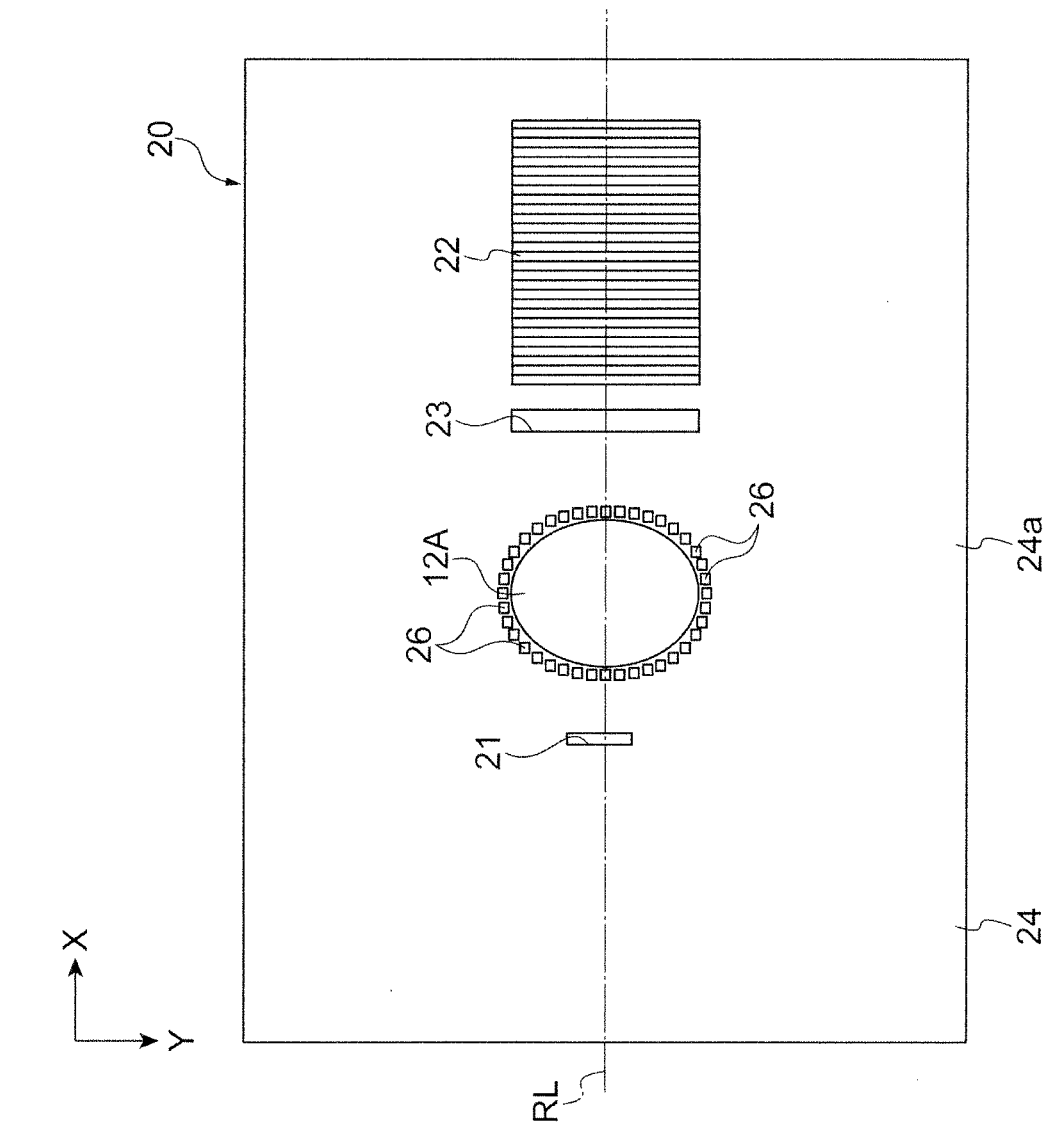
FIG. 4 is a plan view of a light detection element of a modified example of the spectrometer in accordance with the first embodiment of the invention.
Figure 5:
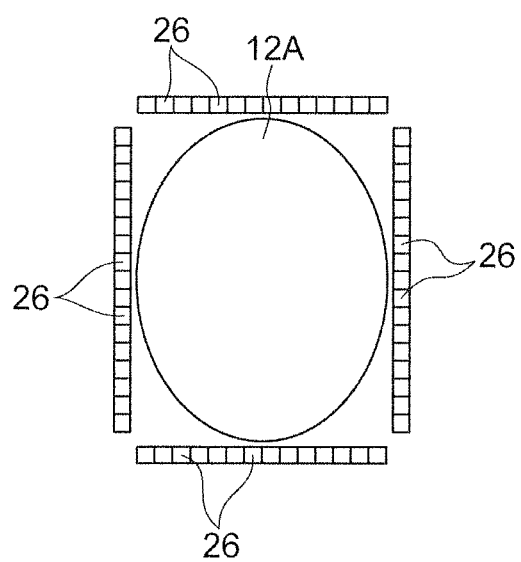
FIG. 5 is a plan view of a second reflection part and a second light detection part of the modified example of the spectrometer in accordance with the first embodiment of the invention.
Figure 5:
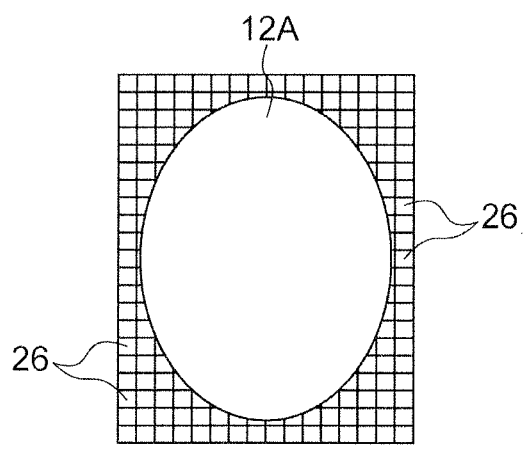

As illustrated in FIG. 4, the plurality of second light detection parts 26 may be disposed along an outer edge of the second reflection part 12A to surround the second reflection part 12A. In this case, it is possible to monitor a shift direction of light entering the second reflection part 12A all around the second reflection part 12A. In addition, as illustrated in FIG. 5(a), the plurality of second light detection parts 26 may be arranged in a one-dimensional shape at both sides of the second reflection part 12A in the direction parallel to the reference line RL and both sides of the second reflection part 12A in the direction perpendicular to the reference line RL. In this case, it is possible to more specifically monitor a shift direction of the light L1 entering the second reflection part 12A in each of the direction parallel to the reference line RL and the direction perpendicular to the reference line RL. In addition, as illustrated in FIG. 5(b), the plurality of second light detection parts 26 may be arranged in a two-dimensional shape in the region that surrounds the second reflection part 12A. In this case, it is possible to monitor the shift direction of the light L1 entering the second reflection part 12A as an image all around the second reflection part 12A.

In addition, in the spectrometer 1A, the light L1 passing through the light passing part 21 is reflected by the first reflection part 11 and the second reflection part 12A in sequence, and enters the dispersive part 40A. In this way, an incident direction of the light L1 entering the dispersive part 40A and a divergence or convergence state of the light L1 may be easily adjusted. Thus, even when the length of the optical path from the dispersive part 40A to the first light detection part 22 is short, the light L2 dispersed by the dispersive part 40A may be accurately concentrated on a predetermined position of the first light detection part 22.

In addition, in the spectrometer 1A, the first reflection part 11 is the concave mirror. In this way, a spread angle of the light L1 is suppressed by the first reflection part 11, and thus the entrance NA of the light L1 passing through the light passing part 21 may be increased to increase sensitivity, and the length of the optical path from the dispersive part 40A to the first light detection part 22 may be further decreased to further miniaturize the spectrometer 1B. Details thereof are described below. That is, when the first reflection part 11 is the concave mirror, the dispersive part 40A is irradiated with the light L1 while the light L1 is approximately collimated. For this reason, a distance at which the dispersive part 40A concentrates light L2 on the first light detection part 22 is short when compared to a case in which the dispersive part 40A is irradiated with the light L1 while the light L1 spreads. Therefore, the entrance NA of the light L1 may be increased to increase sensitivity, and the optical path length from the dispersive part 40A to the first light detection part 22 may be further decreased to further miniaturize the spectrometer 1B.

In addition, in the spectrometer 1A, the support 30 is provided with the wiring 13 electrically connected to the first light detection part 22 and the second light detection parts 26. In addition, the end part 13a of the wiring 13 on the side of the first light detection part 22 and the second light detection parts 26 is connected to the terminal 25 provided in the light detection element 20 in the fixed part of the light detection element 20 and the support 30. In this way, it is possible to secure the electrical connection of the wiring 13 to the first light detection part 22 and the second light detection parts 26.

In addition, in the spectrometer 1A, a material of the support 30 is ceramic. In this way, it is possible to suppress expansion and contraction of the support 30 resulting from a temperature change of an environment in which the spectrometer 1A is used, generation of heat in the first tight detection part 22 and the second light detection parts, etc. Therefore, it is possible to suppress a decrease in detection accuracy (a shift of peak wavelength in light detected by the first light detection part 22, etc.) resulting from occurrence of a variance in a positional relationship between the dispersive part 40A and the first light detection part 22. Since the spectrometer 1A is miniaturized, there is concern that a slight change in an optical path may greatly affect an optical system, leading to a decrease in detection accuracy. For this reason, in particular, as described in the foregoing, when the dispersive part 40A is directly formed in the support 30, it is significantly important to suppress expansion and contraction of the support 30.

In addition, in the spectrometer 1A, the space S is airtightly sealed by the package 60 that includes the light detection element 20 and the support 30 as components. In this way, it is possible to suppress a decrease in detection accuracy resulting from deterioration of a member in the space S due to moisture, occurrence of condensation in the space S due to a decrease in ambient temperature, etc.

In addition, in the spectrometer 1A, a flat region (which may be slightly inclined) is present around the depression 34 on the surface 31a of the base wall part 31. In this way, even when reflected light is generated in the first light detection part 22, the reflected light may be inhibited from reaching the first light detection part 22 again. Further, when the molded layer 41 is formed on the inner surface 34a of the depression 34 by pressing a mold die against resin, and when the sealing member 15 made of resin is disposed among the surface 24a of the substrate 24, the end surface 32a of each side wall part 32, and the end surface 33a of each side wall part 33, the flat region serves as a shelter for surplus resin. In this instance, when the surplus resin is allowed to flow into the through hole 36 of the base wall part 31, for example, the sealing member 16 made of the glass beads, etc. is unnecessary, and the resin functions as the sealing member 17.

Herein, a detailed description will be given of merit obtained by disposing the plurality of second light detection parts 26 in the region that surrounds the second reflection part 12A rather than the region that surrounds the first light detection part 22. For example, when the plurality of second light detection parts 26 is disposed to oppose each other with the first light detection part 22 interposed therebetween in the direction parallel to the reference line RL, the plurality of second light detection parts 26 detects light having a short wavelength or light having a long wavelength in the dispersed light L2. Thus, a detected wavelength is restricted, and detected intensity varies. In addition, when the plurality of second light detection parts 26 is disposed to oppose each other with the first light detection part 22 interposed therebetween in the direction perpendicular to the reference line RL, a shift in optical path in the Y-axis direction may be monitored. However, a monitored result includes a shift in position of the dispersive part 40A, a shift in direction of a grating groove, etc.

In this way, when the plurality of second light detection parts 26 is disposed in the region that surrounds the first light detection part 22, the dispersed light L2 is detected. Thus, it is impossible to determine whether a shift in optical path results from a shift in position of the light detection element 20 and the support 30, or a shift in position of the dispersive part 40A in the support 30.

On the other hand, when the plurality of second light detection parts 26 is disposed in the region that surrounds the second reflection part 12A, light L1 before being dispersed is detected. Thus, it is possible to obtain more detailed shift information of an optical path in addition to a result of detecting the light L2 by the first light detection part 22. In particular, a shift in optical path in the direction parallel to the reference line RL easily leads to deterioration of detection accuracy. Thus, it is important to dispose the plurality of second light detection parts 26 to oppose each other with the second reflection part 12A (dispersive part 40B in a second embodiment described below) interposed therebetween in at least the direction parallel to the reference line RL.

In addition, when a region of the first reflection part 11 and a region of the dispersive part 40A are set to be wide with respect to the entrance NA of the light L1, and the entrance NA of the light L1 is defined by an area of a region of the second reflection part 12A, for example, the whole light L1 is reflected by the first reflection part 11 even when there occurs a shift in position of the light detection element 20 and the support 30. Further, only light L1 corresponding to the defined entrance NA is reflected on the second reflection part 12A, and thus the light L1 corresponding to the defined entrance NA enters the dispersive part 40A. In this instance, a shift in optical path in the second reflection part 12A may be monitored using the plurality of second light detection parts 26 disposed in the region that surrounds the second reflection part 12A.

In addition, when the light detection element 20 is inclined with respect to the support 30, the angle of reflection of the light L1 reflected by the first reflection part 11 changes, and thus a shift direction of the angle of reflection may be obtained by the plurality of second light detection parts 26. When the light detection element 20 is inclined with respect to the support 30, the inclined light detection element 20 easily leads to deterioration of a collimated state of the light L1 due to the first reflection part 11, and easily leads to a shift in position in the Z-axis direction which decreases resolving power. When a result of detecting the light L1 by the plurality of second light detection parts 26 is combined with the result of detecting the light L2 by the first light detection part 22, it is possible to determine whether a shift in direction merely occurs in the Z-axis direction, or whether the light detection element 20 is inclined with respect to the support 30.

In addition, when the light L1 is let into the second reflection part 12A at an entrance NA which is greater than the entrance NA defined by the second reflection part 12A, if the entrance NA of the light L1 let into the spectrometer 1A is adjusted such that the light L1 is not detected by the plurality of second light detection parts 26, detection accuracy may be further improved. Further, even when an incident direction of the light L1 which is let into the spectrometer 1A is shifted, the incident direction may be adjusted while monitoring a state of the light L1 by the plurality of second light detection parts 26.

In addition, when the spectrometer 1A is produced, the support 30 provided with the first reflection part 11 and the dispersive part 40A is prepared (first step), the light detection element 20 provided with the light passing part 21, the second reflection part 12A, the first light detection part 22, and the plurality of second light detection parts 26 is prepared (second step), and then the optical path from the light passing part 21 to the first light detection part 22 is formed in the space S by fixing the support 30 to the light detection element 20 such that the space S is formed (third step). As described above, the optical path from the light passing part 21 to the first light detection part 22 is formed in the space S only by fixing the support 30 to the light detection element 20. Therefore, according to a method for manufacturing the spectrometer 1A, it is possible to easily produce the spectrometer 1A which can attempt miniaturization while suppressing a decrease in detection accuracy. The step of preparing the support 30 and the step of preparing the light detection element 20 may be implemented in an arbitrary order.

In particular, when the spectrometer 1A is produced, in addition to the electrical connection of the wiring 13 to the first light detection part 22 and the second light detection parts 26, fixing of the support 30 to the light detection element 20 and formation of the optical path from the light passing part 21 to the first light detection part 22 are implemented only by connecting the end part 13a of the wiring 13 provided in the support 30 to the terminal 25 of the light detection element 20.

Second Embodiment

Figure 6:
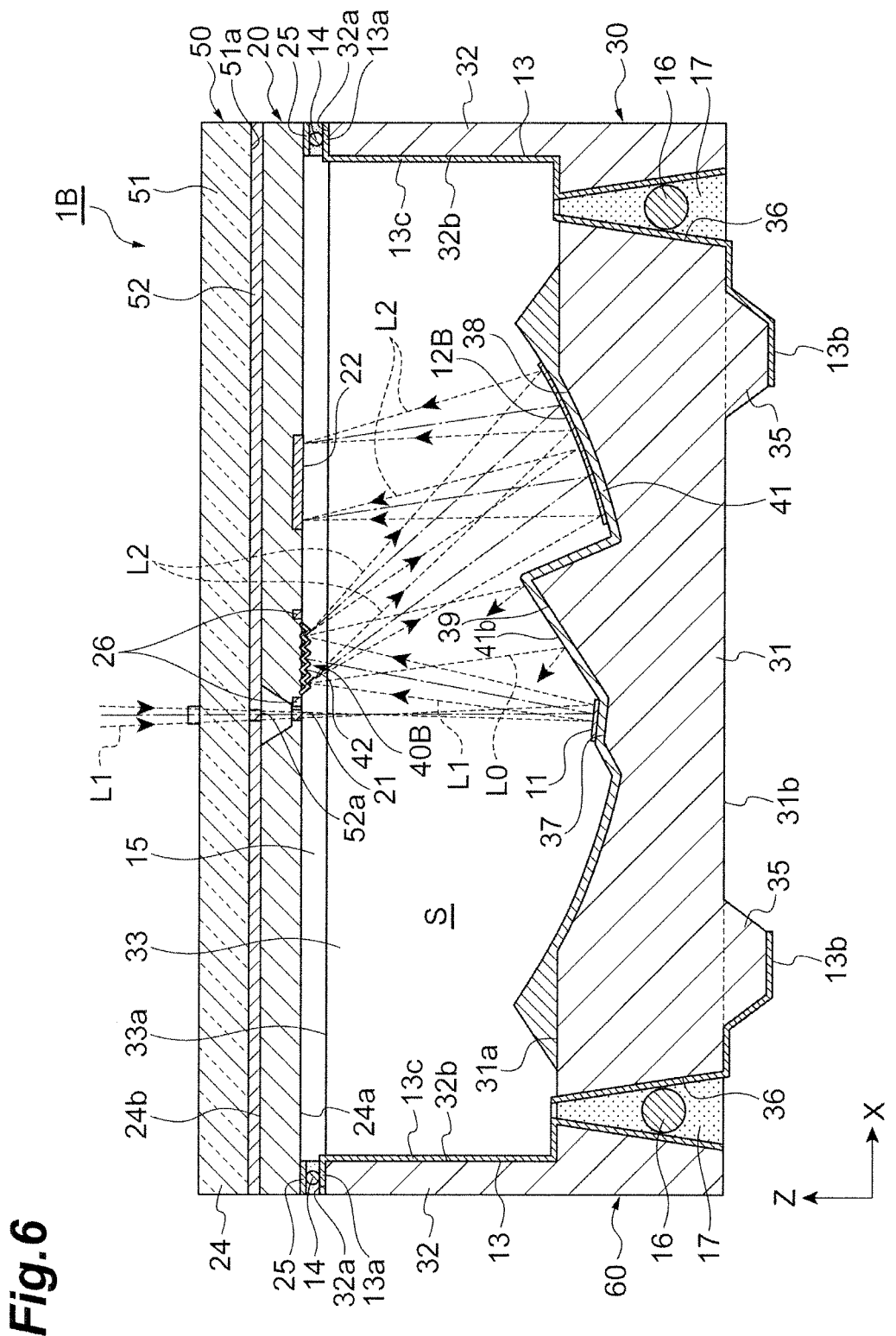
FIG. 6 is a cross-sectional view of a spectrometer in accordance with a second embodiment of the invention.

As illustrated in FIG. 6, a spectrometer 1B is mainly different from the above-described spectrometer 1A in that a dispersive part (second optical part) 40B is provided in a light detection element 20, and a second reflection part (third optical part) 12B is provided in a support 30.

In the spectrometer 1B, a first reflection part 11 is provided on a flat inclined surface 37 inclined at a predetermined angle in a surface 31a of a base wall part 31 with a molded layer 41 interposed therebetween. For example, the first reflection part 11 is a planar mirror including a metal evaporated film of Al, Au, etc. and having a mirror surface. The first reflection part 11 reflects light L1 passing through a light passing part 21 to the dispersive part 40B in a space S. The first reflection part 11 may be directly formed on the inclined surface 37 of the support 30 without the molded layer 41 interposed therebetween.

The dispersive part 40B is provided in a region between the light passing part 21 and a first light detection part 22 on a surface 24a of a substrate 24. The dispersive part 40B is a reflection grating, and disperses and reflects the light L1 reflected by the first reflection part 11 to the second reflection part 12B in the space S.

The second reflection part 12B is provided on a concave surface 38 having a spherical shape in the surface 31a of the base wall part 31 with the molded layer 41 interposed therebetween. For example, the second reflection part 12B is a concave mirror including a metal evaporated film of Al, Au, etc. and having a mirror surface. The second reflection part 12B reflects the light L1 dispersed and reflected by the dispersive part 40B to the first light detection part 22 in the space S. The second reflection part 12B may be directly provided on the concave surface 38 of the support 30 without the molded layer 41 interposed therebetween.

As illustrated in FIG. 7, a plurality of second light detection parts 26 is provided in a region that surrounds the dispersive part 40B. More specifically, the plurality of second light detection parts 26 opposes each other with the dispersive part 40B interposed therebetween in each of a direction parallel to a reference line RL and a direction perpendicular to the reference line RL when viewed in an optical axis direction of the light L1 passing through the light passing part 21. Each of the second light detection parts 26 opposing each other in the direction parallel to the reference line RL has a long shape extending in a Y-axis direction. Each of the second light detection parts 26 opposing each other in the direction perpendicular to the reference line RL has a long shape extending in an X-axis direction.

As illustrated in FIG. 6, zero-order light L0 in the light dispersed and reflected by the dispersive part 40B is reflected by the molded layer 41 on a flat inclined surface 39 inclined at a predetermined angle in the surface 31a of the base wall part 31. A reflection surface of the molded layer 41 on the inclined surface 39 functions as a zero-order light reflection controller 41b. When the inclined surface 39 is set as a surface different from the inclined surface 37 and the concave surface 38, multiple reflection of the zero-order light L0 may be suppressed. Similarly to the spectrometer 1A, a zero-order light capture part 23 may be provided in the light detection element 20.

The zero-order light reflection controller 41b is provided in a region on the surface 31a of the base wall part 31. Here, the zero-order light L0 enters the region from the dispersive part 40B. In the spectrometer 1B, the zero-order light reflection controller 41b is positioned between the first reflection part 11 and a second reflection part 12 in the direction parallel to the reference line RL (that is, the X-axis direction) when viewed in the optical axis direction of the light L1 passing through the light passing part 21 (that is, a Z-axis direction). An inclination of the zero-order light reflection controller 41b is set such that the zero-order light is not let into the first light detection part 22. Therefore, the zero-order light reflection controller 41b may have an inclination at which the zero-order light L0 is not reflected to the first light detection part 22 side as long as the zero-order light is not let into the first light detection part 22 at the inclination. From a viewpoint that influence of the zero-order light is reliably excluded, the zero-order light reflection controller 41b preferably has an inclination at which the zero-order light L0 is reflected to the opposite side from the first light detection part 22 side.

In a step of manufacturing the spectrometer 1B, as described in the foregoing, the molded layer 41, which is smooth, is formed on the inclined surface 37 of the base wall part 31 using a mold die, and the first reflection part 11 is fainted on the molded layer 41. Simultaneously, the smooth molded layer 41 is formed on the inclined surface 39 of the base wall part 31, and a surface of the molded layer 41 is set as the zero-order light reflection controller 41b. Normally, the surface of the molded layer 41 is less uneven and smoother than a surface of the support 30, and thus the first reflection part 11 and the zero-order light reflection controller 41b may be more accurately formed. However, the first reflection part 11 may be directly formed on the inclined surface 37 of the base wall part 31 without the molded layer 41 interposed therebetween, and the inclined surface 39 of the base wall part 31 may be set as the zero-order light reflection controller 41b. In this case, a molding material used for the molded layer 41 may be reduced, and a shape of the mold die may be simplified. Thus, the molded layer 41 may be easily formed.

According to the spectrometer 1B configured as described above, it is possible to attempt miniaturization while suppressing a decrease in detection accuracy due to a similar reason to that in the above-described spectrometer 1A. Further, in the spectrometer 1B, the dispersive part 40B in addition to the light passing part 21, the first light detection part 22, and the second light detection parts 26 is provided in the light detection element 20. Thus, it is possible to accurately maintain a mutual positional relationship among the light passing part 21, the dispersive part 40B, the first light detection part 22, and the second light detection parts 26. Furthermore, when the dispersive part 40B, the production of which is easily complicated when compared to the first reflection part 11 and the second reflection part 12B, is provided in the light detection element 20 together with the light passing part 21, the first light detection part 22, and the second light detection parts 26, it is possible to improve a yield of the support 30, and thus improve a yield of the spectrometer 1B.

The dispersive part 40B may be collectively formed on the surface 24a of the substrate 24. Thus, the dispersive part 40B may be more accurately formed, when compared to a case in which the dispersive part 40B is formed on a curved surface, using a photo process (a stepper, etc. is used), a nanoimprint process, etc. Therefore, alignment, etc. of the dispersive part 40B becomes easier, and high position accuracy is obtained. Meanwhile, it is unnecessary to form a dispersive part in the support 30, and thus formation of the support 30 becomes easier.

The plurality of second light detection parts 26 may be arranged along an outer edge of the dispersive part 40B to surround the dispersive part 40B. In this case, it is possible to monitor a shift direction of light entering the second reflection part 12A all around the dispersive part 40B. In addition, the plurality of second light detection parts 26 may be arranged in a one-dimensional shape at both sides of the dispersive part 40B in the direction parallel to the reference line RL and both sides of the dispersive part 40B in the direction perpendicular to the reference line RL. In this case, it is possible to more specifically monitor a shift direction of the light L1 entering the dispersive part 40B in each of the direction parallel to the reference line RL and the direction perpendicular to the reference line RL. In addition, the plurality of second light detection parts 26 may be arranged in a two-dimensional shape in the region that surrounds the dispersive part 40B. In this case, it is possible to monitor the shift direction of the light L1 entering the dispersive part 40B as an image all around the dispersive part 40B.

In addition, when the spectrometer 1B is produced, the support 30 provided with the first reflection part 11 and the second reflection part 12B is prepared (first step), the light detection element 20 provided with the light passing part 21, the dispersive part 40B, the first light detection part 22, and the plurality of second light detection parts 26 is prepared (second step), and then the optical path from the light passing part 21 to the first light detection part 22 is formed in the space S by fixing the support 30 to the light detection element 20 such that the space S is formed (third step). As described above, the optical path from the light passing part 21 to the first light detection part 22 is formed in the space S only by fixing the support 30 to the light detection element 20. Therefore, according to a method for manufacturing the spectrometer 1B, it is possible to easily produce the spectrometer 1B which can attempt miniaturization while suppressing a decrease in detection accuracy. The step of preparing the support 30 and the step of preparing the light detection element 20 may be implemented in an arbitrary order.

In particular, when the spectrometer 1B is produced, in addition to the electrical connection of the wiring 13 to the first light detection part 22 and the second light detection parts 26, fixing of the support 30 to the light detection element 20 and formation of the optical path from the light passing part 21 to the first light detection part 22 are implemented only by connecting the end part 13a of the wiring 13 provided in the support 30 to the terminal 25 of the light detection element 20.

Hereinbefore, the first and second embodiments of the invention have been described. However, the invention is not restricted to the above respective embodiments. For example, even though the entrance NA of the light L1 entering the space S is defined by the shapes of the light passing part 21 of the light detection element 20 and the light transmitting opening 52a of the light shielding film 52 (the light shielding film formed on a surface of the light transmitting member 51 on the opposite side from the space S side depending on cases) in the above respective embodiments, the invention is not restricted thereto. In the above first embodiment, the entrance NA of the light L1 entering the space S may be practically defined by adjusting a shape of a region of at least one of the first reflection part 11, the second reflection part 12A, and the dispersive part 40A. The light L2 entering the first light detection part 22 is diffracted light, and thus the entrance NA may be practically defined by adjusting a shape of a predetermined region in which the grating pattern 41a is formed in the molded layer 41. In the above second embodiment, the entrance NA of the light L1 entering the space S may be practically defined by adjusting a shape of a region of at least one of the first reflection part 11, the dispersive part 40B, and the second reflection part 12B.

In addition, the space S may be airtightly sealed by a package that accommodates the light detection element 20 and the support 30 in place of the package 60 that includes the light detection element 20 and the support 30 as components. In this case, it is possible to suppress a decrease in detection accuracy resulting from deterioration of a member in the space S due to moisture, occurrence of condensation in the space S due to a decrease in ambient temperature, etc. herein, the package may include a stem into which a plurality of lead pins is inserted, and a cap provided with a light entrance part in which the light L1 is let into the light passing part 21. In addition, the electrical connection between a lead pin and the wiring 13 corresponding to each other, and alignment of the light detection element 20 and the support 30 with respect to the package may be implemented by connecting an end part of each lead pin inside the package to the end part 13b of each wiring 13 provided in the support 30 on the surface 31b of the base wall part 31.

Since the light detection element 20 and the support 30 are accommodated in the package, unlike the above-described spectrometer 1A, it is unnecessary to dispose the sealing members 15 and 16 or provide the cover 50. In addition, the end part of the lead pin inside the package may be connected to the end part 13b of the wiring 13 extending inside a through hole formed in the base wall part 31 or inside a depression formed on the surface 31b of the base wall part 31 while being disposed inside the through hole or inside the depression. In addition, the end part of the lead pin inside the package and the end part 13b of the wiring 13 may be electrically connected to each other through a circuit board on which the support 30 is mounted by bump bonding, etc. In this case, the end part of the lead pin inside the package may be disposed to surround the support 30 when viewed in a thickness direction of the stem (that is, the Z-axis direction). In addition, the circuit board may be disposed in the stem while touching the stem, or may be supported by the plurality of lead pins while being separated from the stem.

In addition, the material of the support 30 is not restricted to ceramic, and another molding material, for example, resin such as LCP, PPA, and epoxy, and glass for molding may be used as the material. Further, when the space S is airtightly sealed by the package that accommodates the light detection element 20 and the support 30, the support 30 may have a plurality of pillar parts or a plurality of side wall parts separated from one another in place of the pair of side wall parts 32 and the pair of side wall parts 33 which surround the space S. In this way, materials and shapes of respective components of the spectrometers 1A and 1B are not restricted to the above-described materials and shapes, and various materials and shapes may be applied thereto.

In addition, in the spectrometer 1A, the first reflection part 11 may be a planar mirror. In this case, when the entrance NA of the light L1 passing through the light passing part 21 is made small, and an inequality of "the optical path length, from the light passing part 21 to the dispersive part 40A, of the light L1 having the same spread angle as a spread angle of the light L1 passing through the light passing part 21">"the optical path length from the dispersive part 40A to the first light detection part 22" is satisfied (optical reduction system), resolving power of the light L2 dispersed by the dispersive part 40A may be increased. Details thereof are described below. That is, when the first reflection part 11 is the planar mirror, the dispersive part 40A is irradiated with the light L1 while the light L1 spreads. For this reason, the entrance NA of the light L1 passing through the light passing part 21 needs to be made small from a viewpoint that a region of the dispersive part 40A is inhibited from widening and a viewpoint that a length at which the dispersive part 40A concentrates the light L2 on the first light detection part 22 is inhibited from becoming longer. Therefore, resolving power of the light L2 dispersed by the dispersive part 40A may be increased by reducing the entrance NA of the light L1 and setting the optical reduction system.

In addition, in the spectrometer 1B, the second light detection parts 26 may not be provided in the light detection element 20. Even in this case, the optical path from the light passing part 21 to the first light detection part 22 is formed in the space S which is formed by the light detection element 20 and the support 30, and thus the spectrometer 1B may be miniaturized. Further, since the dispersive part 40B in addition to the light passing part 21 and the first light detection part 22 is provided in the light detection element 20, a mutual positional relationship among the light passing part 21, the dispersive part 40B, and the first light detection part 22 may be accurately maintained. Therefore, even in this case, it is possible to attempt miniaturization while suppressing a decrease in detection accuracy.

In the spectrometer 1B not provided with the second light detection parts 26, the first reflection part 11 is not restricted to the planar mirror, and may be a concave mirror. In addition, the dispersive part 40B is not restricted to the planar grating, and may be a concave surface grating. Further, the second reflection part 12B is not restricted to the concave mirror, and may be a planar mirror. However, irrespective of whether the first reflection part 11 is the planar mirror or the concave mirror, an optical system, in which the dispersive part 40B is the planar grating and the second reflection part 12B is the concave mirror, is advantageous for attempting miniaturization and high accuracy of the spectrometer 1B since there is difficulty in forming the dispersive part 40B which is the concave surface grating on the surface 24a of the substrate 24 which is a flat surface, and the second reflection part 12B needs to be a concave mirror in order to concentrate the light L2 on the first light detection part 22 in this case. Furthermore, it is more preferable that the first reflection part 11 be the planar mirror in terms of miniaturization of the spectrometer 1B since the light L1 enters the dispersive part 40B while having a predetermined spread angle.

In addition, when the spectrometer 1B not provided with the second light detection parts 26 is produced, the support 30 provided with the first reflection part 11 and the second reflection part 12B is prepared (first step), the light detection element 20 provided with the light passing part 21, the dispersive part 40B, and the first light detection part 22 is prepared (second step), and then the optical path from the light passing part 21 to the first light detection part 22 is formed in the space S by fixing the support 30 to the light detection element 20 such that the space S is formed (third step). As described above, the optical path from the tight passing part 21 to the first light detection part 22 is formed in the space S only by fixing the support 30 to the light detection element 20. Therefore, according to a method for manufacturing the spectrometer 1B, it is possible to easily produce the spectrometer 1B which can attempt miniaturization while suppressing a decrease in detection accuracy. The step of preparing the support 30 and the step of preparing the light detection element 20 may be implemented in an arbitrary order.

In particular, when the spectrometer 1B is produced, in addition to the electrical connection of the wiring 13 to the first light detection part 22, fixing of the support 30 to the light detection element 20 and formation of the optical path from the light passing part 21 to the first light detection part 22 are implemented only by connecting the end part 13a of the wiring 13 provided in the support 30 to the terminal 25 of the light detection element 20.

In addition, even though the terminal 25 of the light detection element 20 and the end part 13a of the wiring 13 opposing each other are connected to each other by the bump 14 in the above respective embodiments, the terminal 25 of the light detection element 20 and the end part 13a of the wiring 13 opposing each other may be connected to each other by soldering. Further, the terminal 25 of the light detection element 20 and the end part 13a of the wiring 13 opposing each other may be connected to each other on the end surface 33a of each side wall part 33 of the support 30 rather than only on the end surface 32a of each side wall part 32 of the support 30. Alternatively, the terminal 25 and the end part 13a may be connected to each other on the end surface 32a of each side wall part 32 and the end surface 33a of each side wall part 33 of the support 30. Furthermore, in the spectrometers 1A and 1B, the wiring 13 may be enclosed on a surface on the opposite side from the space S side in the support 30. In this way, scattering of light due to the wiring 13 exposed to the space S may be prevented.

INDUSTRIAL APPLICABILITY

The invention can provide a spectrometer which can attempt miniaturization while suppressing a decrease in detection accuracy, and a method for manufacturing a spectrometer capable of easily manufacturing such a spectrometer.

REFERENCE SIGNS LIST 1A, 1B: spectrometer; 11: first reflection part (first optical part); 12A: second reflection part (second optical part); 12B: second reflection part (third optical part); 13: wiring; 13a: end part; 20: light detection element; 21: light passing part; 22: first light detection part; 25: terminal; 26: second light detection parts; 30: support; 40A: dispersive part (third optical part); 40B: dispersive part (second optical part); 60: package; S: space; RL: reference line.

The invention claimed is:
1. A spectrometer comprising:
a light detection element provided with a light passing part, a first light detection part, and a plurality of second light detection parts;
a support fixed to the light detection element such that a space is formed among the light passing part, the first light detection part, and the plurality of second light detection parts;
a first optical part provided in the support and configured to reflect light passing through the light passing part in the space;
a second optical part provided in the light detection element and configured to reflect the light reflected by the first optical part in the space; and
a third optical part provided in the support and configured to reflect the light reflected by the second optical part to the first light detection part in the space,
the second optical part or the third optical part disperses and reflects entered light in the space, and
the plurality of second light detection parts is disposed in a region surrounding the second optical part.
2. The spectrometer according to claim 1,
wherein the first optical pall is a first reflection part and configured to reflect the light passing through the light passing part in the space, the second optical part is a second reflection part and configured to reflect the light reflected by the first reflection part in the space, and the third optical part is a dispersive part and configured to disperse and reflect the light reflected by the second reflection part to the first light detection part in the space.

3. The spectrometer according to claim 1, wherein the first optical part is a first reflection part and configured to reflect the light passing through the light passing part in the space, the second optical part is a dispersive part and configured to disperse and reflect the light reflected by the first reflection part in the space, and the third optical part is a second reflection part and configured to reflect the light dispersed and reflected by the dispersive part to the first light detection part in the space.

4. The spectrometer according to claim 1, wherein the light passing part, the first optical part, the second optical part, the third optical part, and the first light detection part are arranged along a reference line when viewed in an optical axis direction of the light passing through the light passing part, and the plurality of second light detection parts opposes each other with the second optical part interposed therebetween in each of a direction parallel to the reference line and a direction perpendicular to the reference line when viewed in the optical axis direction.

5. The spectrometer according to claim 1, wherein the plurality of second light detection parts is arranged along an outer edge of the second optical part to surround the second optical part.

6. The spectrometer according to claim 1, wherein the plurality of second, light detection parts is arranged in a two-dimensional shape in the region surrounding the second optical part.

7. The spectrometer according to claim 1, wherein the support is provided with a wiring electrically connected to the first light detection part and the plurality of second light detection parts, and an end part of the wiring on a side of the first light detection part and the plurality of second light detection parts is connected to a terminal provided in the light detection element in a fixed part of the light detection element and the support.

8. The spectrometer according to claim 1, wherein a material of the support is ceramic.

9. The spectrometer according to claim 1, wherein the space is airtightly scaled by a package including the light detection element and the support as components.

10. The spectrometer according to claim 1, wherein the space is airtightly sealed by a package accommodating the light detection element and the support.

* * * * *